US008589598B2

(12) United States Patent
Bauman et al.

(10) Patent No.: US 8,589,598 B2
(45) Date of Patent: Nov. 19, 2013

(54) MANAGEMENT OF REDUNDANT PHYSICAL DATA PATHS IN A COMPUTING SYSTEM

(75) Inventors: Scott A. Bauman, Rochester, MN (US); Brian L. Bowles, Rochester, MN (US); Anthony P. Vinski, Rochester, MN (US); Rick A. Weckwerth, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/363,352

(22) Filed: Jan. 31, 2012

(65) Prior Publication Data
US 2012/0131238 A1 May 24, 2012

Related U.S. Application Data

(62) Division of application No. 12/426,375, filed on Apr. 20, 2009, now Pat. No. 8,122,166.

(51) Int. Cl.
*G06F 3/00* (2006.01)
*G06F 15/173* (2006.01)

(52) U.S. Cl.
USPC ............ 710/17; 710/18; 710/19; 710/38; 709/239; 709/242; 714/4.2; 714/55

(58) Field of Classification Search
USPC ........................................................ 710/17
See application file for complete search history.

(56) References Cited

U.S. PATENT DOCUMENTS

| | | | |
|---|---|---|---|
| 6,704,812 B2 * | 3/2004 | Bakke et al. | 710/38 |
| 6,769,071 B1 * | 7/2004 | Cheng et al. | 714/4.11 |
| 6,910,098 B2 | 6/2005 | LeCrone et al. | |
| 6,973,529 B2 | 12/2005 | Casper et al. | |
| 6,983,396 B2 | 1/2006 | Brant et al. | |
| 7,003,563 B2 | 2/2006 | Leigh et al. | |
| 7,017,138 B2 | 3/2006 | Zirojevic et al. | |
| 7,058,893 B2 | 6/2006 | Abbott et al. | |
| 7,058,894 B2 | 6/2006 | Abbott et al. | |
| 7,089,497 B2 | 8/2006 | Abbott et al. | |
| 7,093,265 B1 | 8/2006 | Jantz et al. | |
| 7,134,040 B2 | 11/2006 | Ayres | |
| 7,191,260 B2 | 3/2007 | Armstrong et al. | |
| 7,251,743 B2 * | 7/2007 | Chen et al. | 714/6.23 |

(Continued)

OTHER PUBLICATIONS

H. T. Olnowich, "Path Selection in Multi-Stage Networks Based on Availability", IBM Tech Disc. Bulletin vol. 33, No. 3A (Aug. 1990), pp. 363-364.

*Primary Examiner* — Henry Tsai
*Assistant Examiner* — Dean Phan
(74) *Attorney, Agent, or Firm* — Roy W. Truelson

(57) ABSTRACT

A redundancy manager manages commands to peripheral devices in a computer system. These peripheral devices have multiple pathways connecting it to the computer system. The redundancy manager determines the number of independent pathways connected to the peripheral device, presents only one logical device to the operating system and any device driver and any other command or device processing logic in the command path before the redundancy manager. For each incoming command, the redundancy manager determines which pathways are properly functioning and selects the best pathway for the command based at least partly upon a penalty model where a path may be temporarily penalized by not including the pathway in the path selection process for a predetermined time. The redundancy manager further reroutes the command to an alternate path and resets the device for an alternate path that is not penalized or has otherwise failed.

16 Claims, 7 Drawing Sheets

(56) References Cited

U.S. PATENT DOCUMENTS

| | | |
|---|---|---|
| 7,281,169 B2 | 10/2007 | Golasky et al. |
| 7,290,277 B1 | 10/2007 | Chou et al. |
| 7,349,903 B2 | 3/2008 | Clark et al. |
| 7,370,224 B1 | 5/2008 | Jaswa et al. |
| 7,421,710 B2 | 9/2008 | Qi et al. |
| 7,451,341 B2 | 11/2008 | Okaki et al. |
| 7,478,267 B2 | 1/2009 | Matsuki et al. |
| 7,487,269 B2 | 2/2009 | Clark et al. |
| 2004/0128363 A1 | 7/2004 | Yamagami et al. |
| 2007/0174479 A1 | 7/2007 | Sperry et al. |
| 2009/0249102 A1 | 10/2009 | Yong et al. |

\* cited by examiner

Error Table 502

| Error Type | Severity | Duration |
|---|---|---|
| General Transport | Med | 30 sec. |
| No Connection | High | ∞ |
| Device w/ NF Error | Med/High | 45 sec. |
| Data Check Detected | Med | 30 sec. |
| Command Time Out | Med | 30 sec. |

MANAGEMENT OF REDUNDANT PHYSICAL DATA PATHS IN A COMPUTING SYSTEM

CROSS REFERENCE TO RELATED APPLICATIONS

This is a divisional application of copending U.S. patent application Ser. No 12/426,375, filed Apr. 20, 2009, entitled "Management of Redundant Physical Data Paths in a Computing System", which is herein incorporated by reference. This application claims priority under 35 U.S.C. §120 of U.S. patent application Ser. No. 12/426,375, filed Apr. 20, 2009.

The present application is also related to commonly assigned U.S. patent application Ser. No. 12/426,415, filed Apr. 20, 2009, entitled "Management of Redundant Physical Data Paths in a Computing System", now issued as U.S. Pat. No. 8,073,993.

BACKGROUND OF THE INVENTION

1. Field of the Invention

Embodiments of this invention relate generally to the field of computer processing and more specifically relate to managing multiple physical data paths from a host computer system to peripheral devices.

2. Description of the Related Art

Advances in computer processor architecture have resulted in increased processing speeds up to and beyond one gigahertz. One goal of computer development therefore has been directed to having tasks immediately available for these fast processors. Management of internal resources to keep the processor busy may include hardware and software multithreading registers, cache management, pipeline allocation, branch prediction, etc. The external resources may refer to external disk drives, external memory storage, printing, network communication, etc. Typically, management of data for processing along these multiple external pathways, which are usually multiple buses of various protocols to and from these attached peripheral devices, has been relegated to the host operating system and/or the host device driver software applications. Typically during processing to these peripheral devices, the host operating system executes a device driver application or function so that it can communicate with an adapter connected to the peripheral device. The system's operating system executes, for example, an application program until an interrupt or some instruction in the program indicates that a peripheral device needs data, has the required data, or otherwise requires attention. A conventional context switch procedure changes the context of the host processing system between the device driver and the application program that had been executing.

Given the increasing complexity and pervasiveness of today's computer systems and the increased reliance by the users upon these systems, the management of the physical pathways to/from a host computer system is increasingly important. There are many different pathway management protocols: PCI and PCI-X, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc. It is difficult for the operating system to track and maintain the state of all these buses and their various protocols and schemes for ordering or prioritizing commands. A processor's efficiency is severely compromised if it has to manage data transfer on all these various buses at the same time. Bus protocols, moreover, are constantly evolving and moving towards industry standardization but until then connecting to a new device may involve connecting to a new bus with its own proprietary protocol.

Increasingly so in computer systems, there may be more than one physical pathway from an adapter to its peripheral or external device. One method to manage external bus traffic is to use devices with multiple ports, each port having its own I/O adapter that may or may not have a shared or unique cache and with each port having a distinct independent physical pathway to the same external device. The allocation of one pathway as the primary pathway and another or others as backup pathway(s) may be statically assigned in microcode at initialization by the host operating system or the device driver. The host operating system may be aware of the multiple pathways, or may just consider each physical path as a different device. In the latter scenario, even though one device is connected to the host computer system through a dual-ported adapter and there are two independent physical paths to device, the host operating system sees two devices with the same name. In any event, to change or reroute data from the primary to the backup path, the host computer's operating system becomes involved.

The host operating system may have difficulty maintaining cache coherency of adapter caches if there is a separate cache in the adapter for each pathway to the same device. For example, imagine that the host wants to access an external memory device having independent physical paths each with its own adapter. The cache associated with one physical path may have an outstanding WRITE command that hasn't been executed but before it can write the fresh data to the memory location in the peripheral device, a READ command that actually issued after the WRITE command accesses that memory location on the other path and obtains undetected stale data. Because the problem is undetected, no error is generated.

SUMMARY OF THE INVENTION

A method of managing command and data flow to peripheral devices, according to an embodiment of the present inventions is disclosed. The number of a plurality of independent physical paths to at least one peripheral device connected to the computer system is determined. The plurality of independent physical paths to the at least one peripheral device into one logical path are resolved. The one logical path to any components of the computer system that issues a command destined for the at least one peripheral device is presented. The command destined for the at least one peripheral device from the originating and/or preprocessing components is received. It is determined if any of the plurality of independent physical paths are in a temporary penalized state. A physical path not in the temporary penalized state on which to route the received command to the at least one peripheral device is selected. In another embodiment, protocol requirements of the selected physical path are preserved. In another embodiment, the number physical paths in a failed state is determined (the physical paths in a failed state are unable to connect to the at least one peripheral device).

In another embodiment, determining the number of a plurality of independent physical paths to the at least one peripheral device connected to the computer system further involves reading all the identification codes uniquely associated with at least one peripheral device on the plurality of independent physical paths. In another embodiment, the unique identification code associated with at least one peripheral device is a world wide identification code and/or vital product data.

In another embodiment, resolving all of the plurality of independent physical paths to the at least one peripheral device into one logical path further involves, determining if there is a duplicative identification code on any of the plurality of independent physical paths thereby indicating that the at least one peripheral device has a plurality of independent physical paths connected to it, and if so, correlating the connected plurality of independent physical paths.

In another embodiment the number of outstanding commands to the at least one peripheral device are determined, and it is determined if any outstanding command or the received command has any required execution attributes.

In another embodiment any required execution attributes of the received command or of any outstanding commands destined for the at least one peripheral device are honored.

In another embodiment honoring any required execution attributes of the received command and/or of any outstanding commands intended for the at least one peripheral device further includes, if there are outstanding commands, determining if any outstanding command have any required execution attributes, determining if the received command has any required execution attribute, determining if there are any outstanding commands to the at least one peripheral device on more than one independent physical path, and if so waiting until only one independent physical path has any outstanding commands for the peripheral device and selecting the physical path with the outstanding commands for the received command.

In another embodiment a received command load is relocated to the peripheral device on the independent paths.

In another embodiment determining if any of the plurality of independent physical paths are in a temporary penalized state further involves detecting a dispatched command error; classifying the severity of the dispatched command error, and placing the independent physical path associated with the dispatched command error in the temporary penalized state.

In another embodiment, determining if any of the plurality of independent physical paths are in a temporary penalized state further involves removing at least one independent physical path from the temporary penalized state if all of the plurality of independent physical paths are in the temporary penalized state.

In another embodiment, one of the plurality of load balancing factors comprises the number of outstanding commands on a physical path to all devices.

In another embodiment it is determined if routing of the received command upon the selected physical path has failed. The received command is rerouted. It is ensured that the at least one peripheral device is in a state ready to accept the rerouted command.

In another embodiment rerouting the received command further involves: removing the availability of the selected physical path associated with the failed routing of the received command, determining if any of the available plurality of independent physical paths are in a temporary penalized state, selecting a physical path not in the temporary penalized state on which to route the received command to the at least one peripheral device if available, removing at least one independent physical path from the temporary penalized state if all of the available plurality of independent physical paths are in the temporary penalized state, and rerouting the received command upon the independent physical path that is no longer in the temporary penalized state.

In another embodiment a computer system for transferring commands to a peripheral device is described. The computer system includes at least a central processing unit to execute an operating system and at least one device driver application program applicable to at least one peripheral device, a main memory connected to the central processing unit with a memory bus, at least one peripheral device attached to the central processing unit and the main memory, a plurality of independent physical paths connecting the central processing unit and main memory with the at least one peripheral device, and a redundancy manager connected to the at least one peripheral device and to the host system bus, wherein the redundancy manager determines the particular independent physical path to route a command to the at least one peripheral device based at least partly upon whether the particular independent physical path is in a temporary penalized state.

In another embodiment, the plurality of independent pathways do not have the same protocol. In another embodiment the computer systems further includes an input/output adapter.

In another embodiment, the redundancy manager manages command routing upon the plurality of independent physical paths independent from command processing and independent from the protocols of the independent physical paths. In another embodiment, the redundancy manager further includes a path arbitration that chooses for each command the independent path for the command to be routed to the at least one peripheral device. In another embodiment, the redundancy manager further includes a path resolver that resolves all the independent physical paths to the at least one peripheral device into one logical path presented to the operating system, the device driver application program, the command processing. In another embodiment, the redundancy manager further includes an error classifier that classifies dispatched command errors associated with the plurality of independent physical paths. In another embodiment, the redundancy manager further comprises a path repair detector that detects when the independent physical path in the failed connection state is once again functional and begins to manage commands on the recovered path.

In another embodiment, the redundancy manager further includes a linked list object associated with each of the plurality of possible states. In another embodiment, the plurality of possible states include: an active connection state, an idle redundant state, a penalized connection state, and a failed connection state.

In another embodiment the particular individual independent physical path is unavailable to be chosen by the path arbitration if it is in the failed connection state, and wherein the individual independent physical path in the penalized connection state is unavailable to be chosen by the path arbitration for a predetermined time.

In another embodiment, path arbitration further includes a rerouter which reroutes commands from an unavailable independent physical path to a available independent physical path connected to the peripheral device.

In another embodiment, an I/O adapter able to be connected to a host, the host having at least an operating system and a plurality of device driver applications, and to a plurality of external peripheral devices of which at least one of the external peripheral devices has a multiported connection to independent physical paths able to be connected to the I/O adapter, is described. The I/O adapter includes at least a redundancy manager able to be connected to the at least one peripheral device and to the host, wherein the redundancy manager determines the particular independent physical path to route a command to the at least one peripheral device based at least partly upon whether the particular independent physical path is in a temporary penalized state.

This and other features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
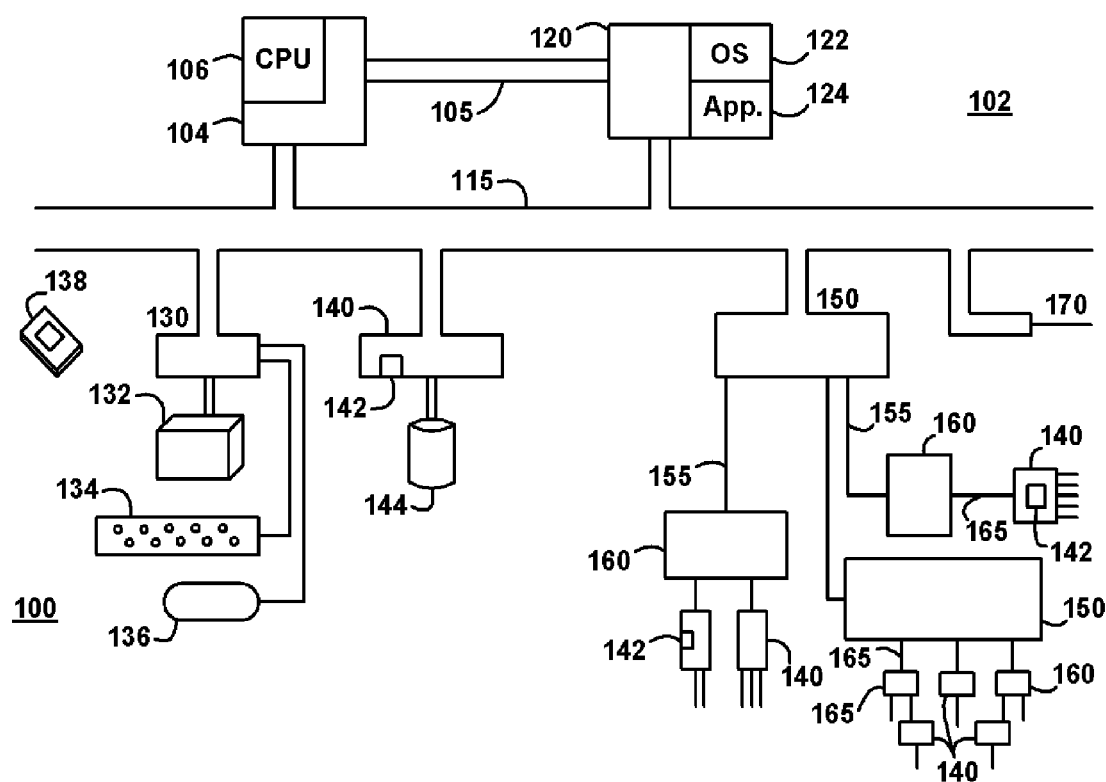
FIG. 1 depicts an exemplary computer system capable of implementing various embodiments of the present invention.

For a better understanding of the various embodiments of the present invention, together with other and further features and advantages thereof, reference is made to the following description, taken in conjunction with the accompanying drawings, and the scope of the invention asserted in the claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of selected exemplary embodiments of the invention.

As will be appreciated by one skilled in the art, various embodiments of the present invention may be embodied as a system, method, computer program product or any combination thereof. Accordingly, embodiments of the present invention may take the form of an entirely hardware embodiment, an entirely software embodiment (including firmware, resident software, micro-code, etc.) or an embodiment combining software and hardware aspects that may all generally be referred to, for example as a "circuit," "module" or "system."

Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic or other such storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. In addition, features described in connection with a particular embodiment may be combined or excluded from other embodiments described herein.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates the components and an interconnection topology for an information handling system, typically a computer system 100, utilizing the present invention. Computer system 100 may comprise a host 102 having a host processor complex 104 connected to a main memory 120 by an internal bus 105 and/or a host system bus 115. The host processor complex 104 has at least one general-purpose programmable processor unit (CPU) 106, executing program instructions stored in main memory 120. Although a single CPU 106 is shown in FIG. 1, it should be understood that many processor complexes 104 have multiple CPUs 106.

Main memory 120 may be physically included within the host processor complex 104 or connected to it via an internal bus system 105 or via a host system bus 115. Memory 120 is a random access semiconductor memory for storing data and programs; memory 120 is shown conceptually as a single monolithic entity but in many computer systems 100, memory is arranged as a hierarchy of caches and other memory devices. In some instances, a hierarchy of cache memories is associated with each CPU 106. Memory 120 includes operating system (OS) 122 and applications 124. Operating system 122 provides functions such as device drivers or interfaces, management of memory pages, management of multiple tasks, etc., as is known in the art. Applications 124 may include a server software application in which case network interface 170 may interact with a server software application 124 to enable computer system 100 to be a network server.

Host system bus 115 supports the transfer of data, commands, and other information between the host processor system 102 and any peripheral or external device attached to it, and any communication of data which may occur between the external devices independent of the host processor complex 102. While shown in simplified form as a single bus, the host system bus 115 may be structured as multiple buses which may be hierarchically arranged. Host system bus 115 is illustrated as being connected to a myriad of external or peripheral devices either through a connection hub 130, or through an adapter 140, or a multifunction adapter 150, or directly to a network 170. These peripheral devices may include a monitor or display 132, a keyboard 134, a mouse or other handheld device 136, and a printer 138. Display 132 may be a cathode-ray tube display, a flat panel display, or a touch panel, and other display technology. One or more adapters 140 may support keyboard 134 and pointing device 136 depicted as a mouse; it being understood that other forms of input devices could be used. The number and types of devices shown in FIG. 1 are illustrative only and ordinary users of computer systems now know that a great variety of connected devices exist; e.g., microphones, speakers, infrared remote controls, wireless, etc. The computer system 100 is not limited to those devices illustrated in FIG. 1.

The host system bus 115 is also shown connected to an adapter 140 illustrated here as an I/O adapter connected to an external memory device 144. External memory device 144 may be rotating magnetic disk storage; e.g., a RAID-X configuration where X (RAID 0, 1, 2, 3, 4, 5, 6, 10, 53, etc.) represents a particular embodiment, or rotating or static optical drives, or magnetic tape storage, etc. Apart from and in addition to conventional adapter and related control components such as direct memory access components, within the context of the various embodiments of the present invention herein adapter 140 includes adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 processes incoming downstream messages from the host processor complex 102 and generates and transmits response messages to the host processor complex 102. Whether simple having only limited decision logic or complex having a message processor 142, an adapter contains the necessary electronic components and logic to adapt or convert data of one protocol on one bus to another protocol on another bus. Adapters 140 may connect a wide variety of devices to the host computer system and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165. Various components may be connected to the primary bus 155 including, for example, adapter 140, a bridge device 160, or another multifunction I/O processor or a multifunction adapter 150.

The bridge device 160 bridges the primary bus 155 and a secondary bus 165 to which various adapters 140 may be connected. The adapters 140, the primary bus 155, and the secondary bus 165 may conform to the PCI/PCI-X or other industry bus specification. One skilled in the art realizes, however, that the implementation is not limited to a PCI/PCI-X or a SCSI or USB bus implementation but is applicable to any electrical or optical bus where data must be efficiently transferred. A wireless bus implementation may also be included as part of the invention herein.

Network interface 170 provides a physical connection for transmission of data to and from a network. The network may be Internet but could also be any smaller self-contained network such as an intranet, a WAN, a LAN, or other internal or external network using; e.g., telephone transmission lines, cable services, satellites, fiber optics, T1 lines, etc., and any various available technologies. Network interface 170 may comprise a modem connected to a telephone line through which an Internet access provider or on-line service provider is reached, but increasingly other higher bandwidth interfaces are implemented. For example, computer system 100 may be connected to another network server via a local area network using an Ethernet, Token Ring, or other protocol, or a second network server in turn being connected to the Internet. Alternatively, network interface 170 may be provided through cable television, fiber optics, satellites, wireless, or other connections.

Finally, computer system 100 need not be a computer at all, but may be a simpler appliance-like client device with less memory such as a network terminal, a thin client, a terminal-like devices, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pages, simple messaging devices and wearable devices. Thus when the computer system 100 is a mobile device, the adapters 140 and network interfaces 170 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a computer system 100.

The computer system shown in FIG. 1 is intended to be a simplified representation, it being understood that many variations in system configuration are possible in addition to those specifically mentioned here. While computer system 100 could conceivably be a personal computer system, the computer system 100 may also be a larger computer system such as a general purpose server. Computer system 100 and its components are shown and described in FIG. 1 above as a more or less single, self-contained computer system. It is alternatively possible to use multiple computer systems, particularly multiple systems which share a single large database, each having a specialized task. References herein to a computer system 100 should be understood to include either a single computer or a collection of computer systems which provides access to a legacy application and to a network by which to connect to a client system.

As will be described in detail below, aspects of various embodiments of the present invention pertain to specific method implementable on a computer system 100. In an alternative embodiment, the invention may be implemented as a computer program-product for use with either or both a computer system 100 or an adapter for a peripheral device. The programs defining the functions of the various embodiments can be delivered to the computer system 100 and/or to the peripheral device for installation on a connected adapter via a variety of signal-bearing media, which include, but are not limited to: (a) information permanently stored on non-writable storage media; e.g., read only memory devices within either computer such as CD-ROM disks readable by CD-ROM; (b) alterable information stored on writable storage media; e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

In certain embodiments, when computer system 100 is programmed to perform particular functions pursuant to instructions from program software that implements the system and methods of this invention, such computer system 100 in effect becomes a special purpose computer particular to various methodology embodiments of this invention.

Computer programs implementing the various systems and methods of this invention may be distributed to computer system 100 on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer.

Figure 2:
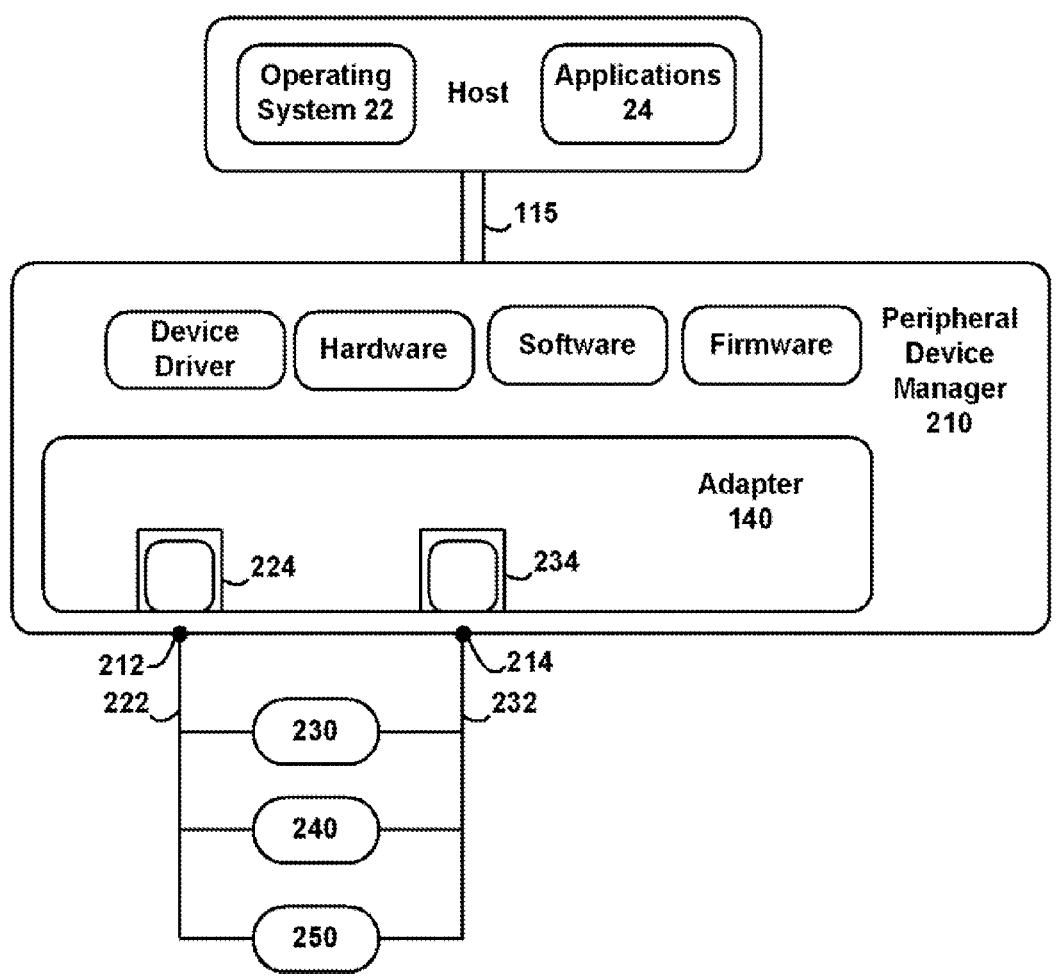
FIG. 2 depicts of a peripheral device manager, having two independent ports, attached to a host computer system, according to an embodiment of the present invention.

FIG. 2 is a simplified representation of a peripheral device manager 210 of the computer system 100 of FIG. 1. The peripheral device manager 210 is connected to the host processor complex 102 and to the operating system 122 and applications 124 across the host system bus 115 for the transfer of data to/from peripheral devices 230, 240, 250. Shown within the peripheral device manager 210 are two ports 212, 214 and the adapter 140. The adapter 140 is connected through each port 212, 214 to an independent physical path 222, 232, respectively, each of which provides a separate path to peripheral devices 230, 240, and 250. More ports may be used to connect more or fewer devices; the number and kinds of peripheral devices being only representative of the multiple physical paths which may be provided by commonly available multi-ported peripheral devices. The number of redundant paths to a given peripheral devices is not fixed and may vary from zero, i.e., one path having no redundancy, to N paths with N-1 redundancy. Each physical path 222, 232 may be a bus but need not be configured to be the same as any other independent physical path to the same device; e.g., physical path 222 may be a SCSI bus and physical path 232 may be a fiber channel or Infiniband bus. The redundancy manager, moreover, may be equipped to route commands on a wireless independent path. Within the adapter 140 is device control logic 224, 234 to control and reset each device 230, 240, 250, hardware, software, and/or firmware. In certain embodiments, peripheral device manager 210 also comprises a device driver, hardware, software, and/or firmware. Still in other embodiments adapter 140 may be configured to fully or partially take the place of the peripheral device manager 210. For example, adapter 140 may be an I/O adapter.

Figure 3:
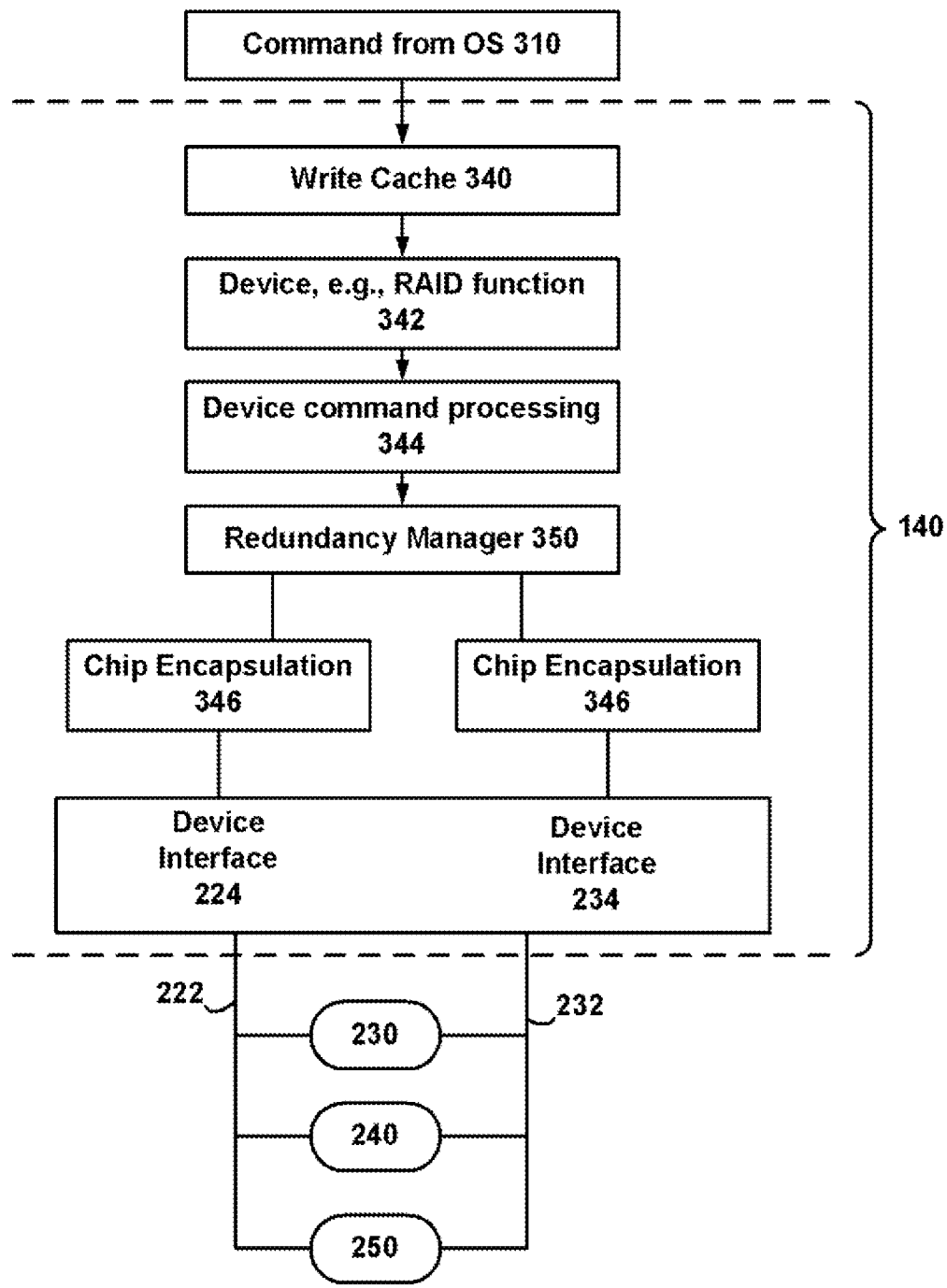
FIG. 3 depicts the logic of command processing and a redundancy manager, according to an embodiment of the invention.

With reference to FIG. 3, there is shown a simplified logic chart of the functions and the device mechanisms embodied in the adapter 140 which are used in accordance with principles of the invention. In block 310, the host processor complex 102 issues a command from the operating system 122, 124 along the host system bus 115 to an adapter 140. Exemplary I/O commands that are issued from the host operating system 122, 124 include READ/WRITE, FORMAT, REASSIGN, READ CAPACITY, etc. The adapter 140 comprises a redundancy manager 350. The redundancy manager 350 may also be implemented by control circuitry through the use of logic gate, programmable logic devices, or other hardware components in the adapter, or in the peripheral device manager, in lieu of microcode. Within the adapter 140, microcode or firmware may perform advance function processing as provided; e.g., write caching 340, RAID or other device scheduling 342, and device command processing 344 to build a command in the device language.

In various embodiments, the command issued by the host operating system 122 and/or applications 124 may be stored in the adapter's write cache 340, if available. A new command is selected from the write cache 340 according to a command issuance scheme. If there is specialized function processing such as compression, read caching, RAID scheduling, mirroring, etc., those processes occur under the auspices of the device function microcode 342. The device command processing section 344 of the adapter 140 then logically translates the new command into the device language and builds a command the device can interpret. From the device command processing 344, the redundancy manager 350, which in accordance with various embodiments of the invention, dynamically determines which physical path will be used for transmission of each command. Once the redundancy manager 350 chooses the physical path, the command is forwarded to chip encapsulation 346 (i.e. a layer of code, etc.) which sets registers and hardware of the device interfaces 224, 234 for the adapter to actually communicate across the physical path to the device itself. From the device interfaces 224, 234, the command is received in the device and the device executes the command. The device then sends a response indicating if the command was successfully executed or if an error or other conditions attach to the response. The response returns to the chip encapsulation code 346 which in turn notifies the redundancy manager 350 and forwards the command response to the device command processing 344. If any error recovery occurs because the command was unable to execute, error recovery may take place in the device command processing 344. The device command processing 344 forwards the response to the host operating system 122, 124.

In certain embodiments, the redundancy manager 350 manages all the physical paths to a device to which it is attached so that the host operating system 122 and driver software 124, any write cache 340, any device function 342 and/or any device command processing 344 is unaffected by either the redundancy manager 350 or the number of redundant paths that actually exist. The management and use of all the pathways to a particular device by the redundancy manager 350, moreover, may be transparent to these components, i.e., the interface presented to the host driver software, the write cache 340, and the device function 342 and command processing 344 when using redundant paths is the identical interface used when no redundancy is supported.

In certain embodiments of the invention, the redundancy manager 350 discovers and resolves all the devices on all physical paths to which it is connected. Although there may be N physical paths to a particular device, the redundancy manager 350 ultimately presents one logical path to the operating system 122 and the device and command functions above the redundancy manager 350 by correlating information from the N paths and resolving existing aliases. The redundancy manager 350 interrogates each physical path and determines the number of active/inactive devices on each path by reading the world wide identification code and/or the vital product data. Using the identification code and/or the vital product data, the redundancy manager 350 then resolves aliases, correlates the separate physical paths to/from each device into one logical path, and presents the device to the operating system. Further, the redundancy manager 350 conforms commands on each physical path to the ordering semantics and other requirements of the operating system and maps the command to the physical capabilities of the protocol of the physical path used, for example, the redundancy manager 350 would implement the queue tags of the SCSI architectural model (SAM) protocol.

Figure 4:
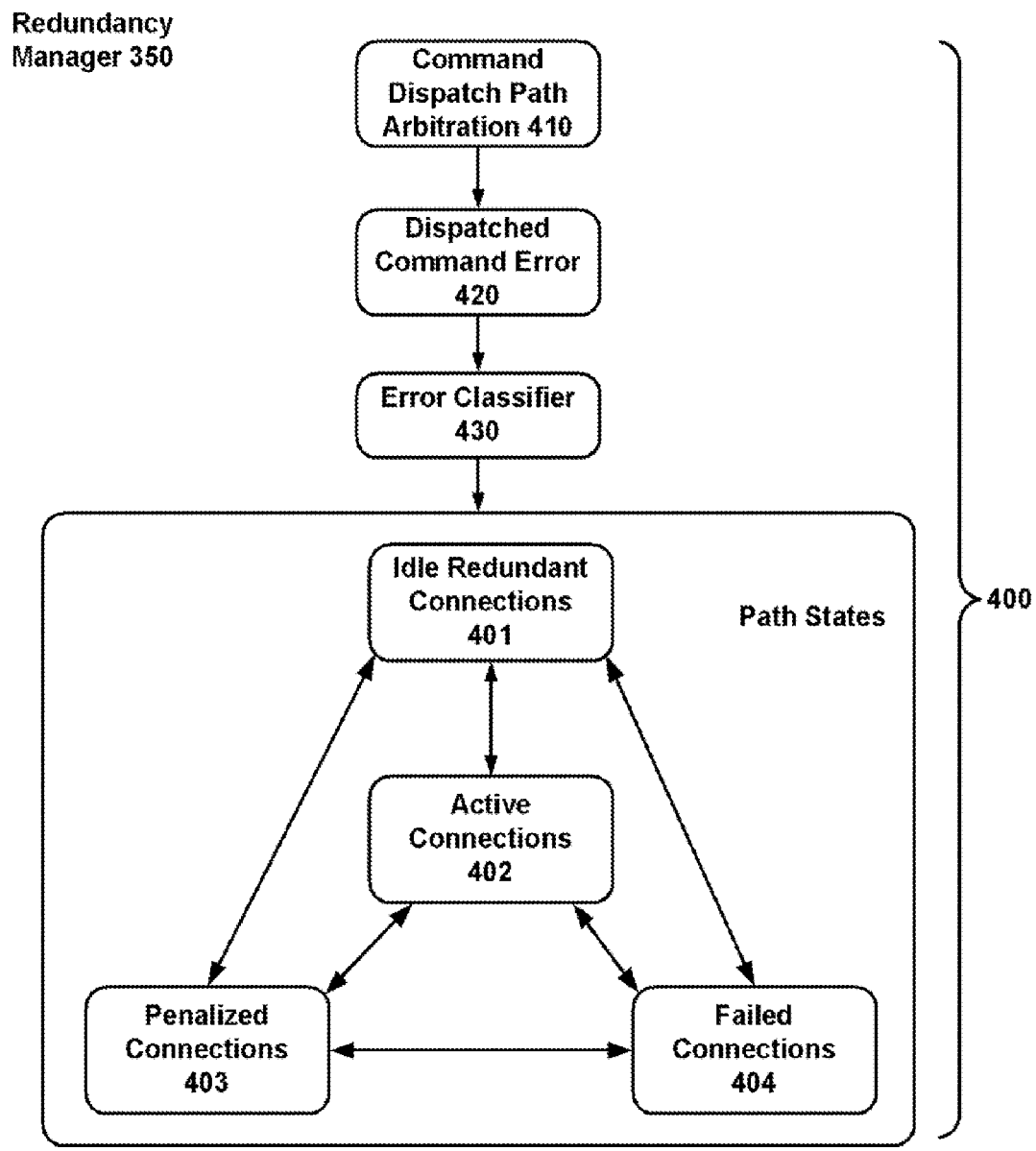
FIG. 4 depicts the redundancy manager utilizing a penalty based model, according to an embodiment of the present invention.

FIG. 4 depicts a more detailed view of device command processing 344 and redundancy manager 350. In various embodiments, following device command processing 344, the redundancy manager 350 dynamically determines which physical path will be used for transmission of each command. In certain embodiments command processing 244 may comprise command dispatch path arbitration 410 to determine which physical path will be used for transmission of each command. In certain embodiments command dispatch path arbitration 410 may be any such arbitration scheme embodied in adapter 140. In other embodiments dispatch path arbitration 410 may be an arbitration scheme that determines a path at least partly based on a penalty model further described below. Peripheral device manager 210 is therefore able to be customized to create a command scheduling and path verification policy that may be used conjunction with the penalty model 400. Command dispatch path arbitration 410 may also be altered based upon the characteristics of the peripheral device 230, 240, or 250.

The redundancy manager 350 may further comprise an error classifier 430 and may utilize a penalty model 400 to penalize a particular path depending on the classification of the command error 420. Penalty model 400 utilizes different path states to manage, or otherwise aid in, the selection of a particular path for use in the connection to the peripheral device. Various exemplary states utilized in the penalty model 400 are as follows: idle redundant connections state 401, active connections state 402, penalized connections state 403, and failed connections state 404.

Upon detection of a dispatched command error 420, or other such failure, penalty model 400 evaluates the error and categorizes it based on its type, severity, and frequency utilizing error classifier 430. Dispatched command error 420 may be for example classified as a minor error (i.e. a recoverable error), a major error (i.e. a unrecoverable error), etc. The path that was associated with the dispatched command error 420 is penalized by placing the chosen path into penalized connection state 403 for an amount of time that may be dependent upon the classification of the error. When in the penalized connection state 403, the path is unavailable for consideration in dispatch path arbitration 410 until the predetermined time period lapses. Therefore subsequent operations or commands will not use the unavailable path, and consequently the unavailable path is not overly affected by a particular error condition. Once the predetermined amount of time elapses, the redundancy manger 350 forces the previously penalized path to an active connection state 402 (i.e. a working state, etc.) in order to again be considered in dispatch path arbitration 410.

In certain embodiments the redundancy manager utilizes linked list manipulation of path objects to place a path into a state. A linked list exists for each state, and during normal functional operation a path object representing that path is in the active connection list. Thus, for example, when an error occurs on a path, the path object representing that path is moved from the active connection linked list to the penalized connection linked list. Therefore in certain embodiments, path arbitration 410 may only consider the path(s) having a path object in the active connection linked list.

Figures 5, 6:
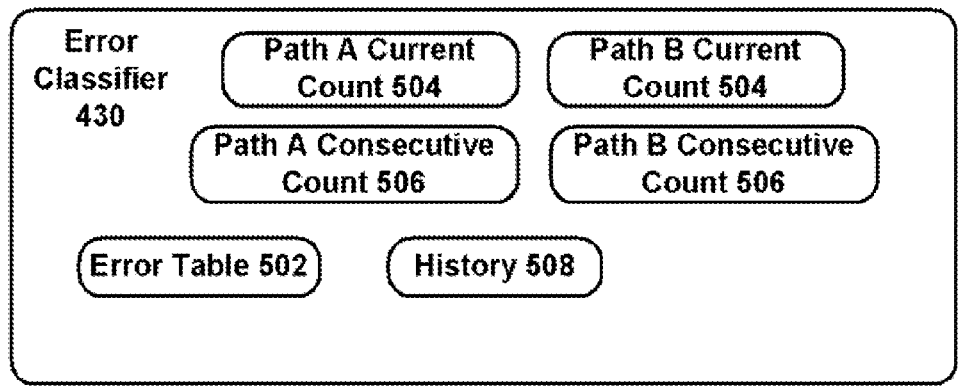
FIG. 5 depicts an exemplary error classifier utilized by the redundancy manager, according to an embodiment of the present invention.
FIG. 6 depicts an exemplary error table utilized by the error classifier, according to an embodiment of the present invention.

If all available paths are associated with recent command errors 420, it may be possible for all paths to be forced into penalized connection state 403. However, in order to provide command access to the peripheral device 230, 240, or 250, redundancy manager 350 may force one path to be available even if all paths were associated with a dispatched command error 420. Utilizing error classifier 430 and monitoring current error counts 504, as shown in FIG. 5, redundancy manager 350 may monitor and force the best of any penalized path to the active connection state 402 if no other non penalized paths are available. In other words, forcing at least one path to the active connection state 402 may override the time based penalties for the particular penalized path(s) as described above. By monitoring the error classifier 430, redundancy manager 350 is aware that the path forced into the active connection state 402 has previously been forced into the penalized connection state 403, should any future errors occur. In certain embodiments, the host need not interrupted, or otherwise notified, when the path state is changed to/from the penalized connections state 403 from/to the active connection state 402.

For certain types of major penalties, the redundancy manager 350 may force a path from active connection state 402 directly to the failed connections state 404, thus bypassing the penalized connection state 403. This action may be applicable for example where the dispatched command error 420 is not expected to correct itself (i.e. an unrecoverable error, etc.), or where there is an independent external notification expected that would indicate the dispatched command error 420 was fixed. The redundancy manager 350 may force the paths in the failed connection state 404 to the active connection state 402 upon receiving a notification that indicates the unrecoverable command error 420 was fixed. In certain embodiments, the host need not be interrupted, or otherwise notified, when the path state is changed to/from the failed connections state 404 from/to the active connection state 402.

In certain embodiments, redundancy manger 350 further comprises a path repair detector. The path repair detector detects when the failed independent physical path is once again functional and then allows the redundancy manager to manage commands on the recovered path. The detection, failover, and recovery from a failed physical path may be automatic and happens without host operating system or driver software intervention. In certain embodiments, with the redundancy manager, a failed physical path does not result in lost access to a resource; it only reduces the total available bandwidth until the failed physical path is repaired. The redundancy manager will not use the failed physical path until it is repaired. The redundancy manager ensures that the peripheral devices are in the state expected by the device command processing; e.g., an ACA state used by the SAM protocol by, for instance, issuing commands to the peripheral device using a functional physical path to get the peripheral device into the expected state.

In certain embodiments, threshold conditions may be specified for certain types of command errors 420. For example, the peripheral device manager 210 may specify that if paths are associated with particular error types a threshold number of instances, those paths are forced into the failed connections state 404. The peripheral device manager 210 may also specify that if a path is placed in the penalized connection state 403 a threshold number of instances, that path would then be placed in the failed connection state 404, thus triggering a corrective maintenance signal. Similarly, the redundancy manager 350 can set certain major errors to result in the immediate removal of the path from consideration in path arbitration 410 by forcing the path into the failed connections state 404. By allowing dispatch path arbitration 410 to be customized or otherwise modifiable, the redundancy manager 350 is flexible to allow or disallow certain quantities or types of dispatched command 420 errors to affect whether a path is considered in path arbitration 410.

In certain embodiments penalty model 400 may also utilize the idle redundant connections state 401 which allows the peripheral device manager 210 to verify idle paths by sending a heartbeat signal to determine whether a specific paths is accessible. An idle command, a heartbeat command, or otherwise non working command, is a command having a primary purpose to determine whether a specific path is accessible. If a heartbeat signal does not make it to the peripheral device 230, 240, or 250, of if another type of error occurs, the peripheral device manager 210 has detected a failure. These failures may be automatically reported to the host so repair actions can be performed proactively. There is a benefit to detecting errors using a heartbeat signal, since errors are identified without affecting a working command. A working command is a command having a functional use. If an error affects heartbeat signals, as opposed to working commands, working commands would not be damaged, lost, or otherwise affected by the error. In other embodiments the redundancy manager 350 may control both the granularity and frequency of the heartbeat signals and the type of paths that the heartbeat signals are to be sent (i.e. paths in the idle state, paths in the active state, and/or paths in penalized state).

FIG. 5 depicts an exemplary error classifier 430 utilized by the redundancy manager 350, according to an embodiment of the present invention. Error classifier 430 is logic embodied in the hardware, software, and/or firmware of the redundancy manager 350. Upon detection of a dispatched command error 420, redundancy manager 350 evaluates the error and categorizes it based on its type, severity, and frequency utilizing error classifier 430. For example, dispatched command error 420 may be classified as a minor error or a major error. In certain embodiments error classifier 430 may comprise a current count 504, consecutive count 506, an error table 502, and a history 508.

A consecutive count 506 of errors for each path may be kept in the error classifier 430. For example a consecutive count 506 may be kept for path "A" and a consecutive count 506 may be kept for path "B". Consecutive count 506 identifies how many consecutive instances has the dispatched command attempted to use a particular path and has encountered an error. In certain embodiments, by monitoring consecutive error counts 506, redundancy manager 350 may monitor and force the best of all penalized paths to the active connection state 402 if no other non penalized paths are available.

A current count 504 of errors for each path may be kept in the error classifier 430. For example a current count 504 may be kept for path "A" and a current count 504 may be kept for path "B". Current count 504 identifies how many instances has the dispatched command attempted to use a particular path and has encountered an error. In certain embodiments, current count 504 may be considered as a total error count for the particular path, but in other embodiments, current count 504 may be reset to zero after a predetermined time period elapses. In certain embodiments, by monitoring current error counts 504, redundancy manager 350 may monitor and force the best of any penalized paths to the active connection state 402 if no other non penalized paths are available.

In certain embodiments consecutive count 506 and current count 504 may be each incremented for each error on a particular path. However consecutive count 506 and current count 504 differ in timing of when the tallied counts are cleared or reset. The consecutive counts 506 associated with a particular path are reset immediately upon a successful command completion on that path. Current count 504 may not reset at all (and thus may represent the total number of errors for the life of the path), although current count 504 may be reset after a predetermined duration (days, weeks, etc.)

In certain embodiments history 508 is kept in the error classifier 430. History 508 is a record of previous path failures. History 508 may be used for debug, or when moving paths directly from the failed connection state 404 to the active connection state 202. History 508 is available to be used by the error classifier (430) and aids in the classification of error severity.

In certain embodiments error table 502 is kept in the error classifier 430. Error table 502 keeps information regarding the various dispatched command errors 420. For example error table 502 may have a listing of the types of dispatched command errors 420, the severity of each type of dispatched command errors 420, the time duration that the path associated with the dispatch command error 420 should be placed in the penalized connection state 403.

FIG. 6 depicts an exemplary error table 502 that may be utilized by the error classifier 430, according to an embodiment of the present invention. Error table 502 may have a listing of possible dispatched command errors 420. Examples of such errors are as follows and further described below: general transport error(s), command time out error(s), no connection error, device with normal flow error(s), and detected data check error(s), etc.

A general transport error is an error of a physical interconnect and may be for example a frame level error, link level error, noise error(s), etc. Various general transport errors surface because of the layers involved in the transport protocol being used. Modern protocols have more verification completed at lower layers than previous protocols, so there is a wider source of errors. In general, general transport errors are recoverable in nature (thus not an indication of collapse of the physical connection), likely acute in nature (though could be a sign of something more chronic), and attributed to the fabric involved in connecting the adapter and device (i.e. where the redundant connections are located). As indicated in FIG. 6, a general transport error may be considered a medium severity error resulting in a path to be forced into the penalized connection state 403 for thirty seconds.

A command time out error is an error that may be given where too much time has elapsed before a command successfully is sent to the device. A command time out error may be given for example in the situation where a command was sent to a present peripheral device 230, 240, or 250 and no response was sent back to the peripheral device manager 210 indicating the successful completion of a sent command. After a predetermined time duration elapses, or after a predetermined number of unsuccessful attempts, a command time out error is be issued. As indicated in FIG. 6, a command time out error may be considered a medium severity error resulting in a path to be forced into the penalized connection state 403 for thirty seconds.

A no connection error is an error where there is no contact between the host and the device. A no connection error may be given for example, when the peripheral device manager 210 can not make contact with a present peripheral device 230, 240, or 250. As indicated in FIG. 6, a no connection error may be considered a high severity error resulting a path to be forced into the failed connection state 404 until corrective action is taken.

A device with normal flow error is an error where the peripheral device 230, 240, or 250 indicates that it has received the dispatched command but that it also had a problem processing or otherwise using at least part of the dispatched command. A device with normal flow error is an error with the path or the general transportation of the command, and not with the device itself. As indicated in FIG. 6, a device with normal flow error may be considered a medium high severity error resulting in a path to be forced into the penalized connection state 403 for forty five seconds.

A detected data check error is an error where bad data from the peripheral device 230, 240, or 250 has been attempted to be read by the host. The adapter 140 may attach extra integrity fields to the user data to verify integrity of the data read from the device (e.g., Cylic Redundancy Check, Longitudinal Redundancy Check, etc.). These particular errors would have had successful completions at the device and link/transport levels, however failed the basic data integrity check performed by the adapter 140. Thus, they are higher level adapter 140 detected "end-2-end" errors, not device/link detected errors. As indicated in FIG. 6, a detected data check error may be considered a medium severity error resulting in a path to be forced into the penalized connection state 403 for thirty seconds.

Figure 7:
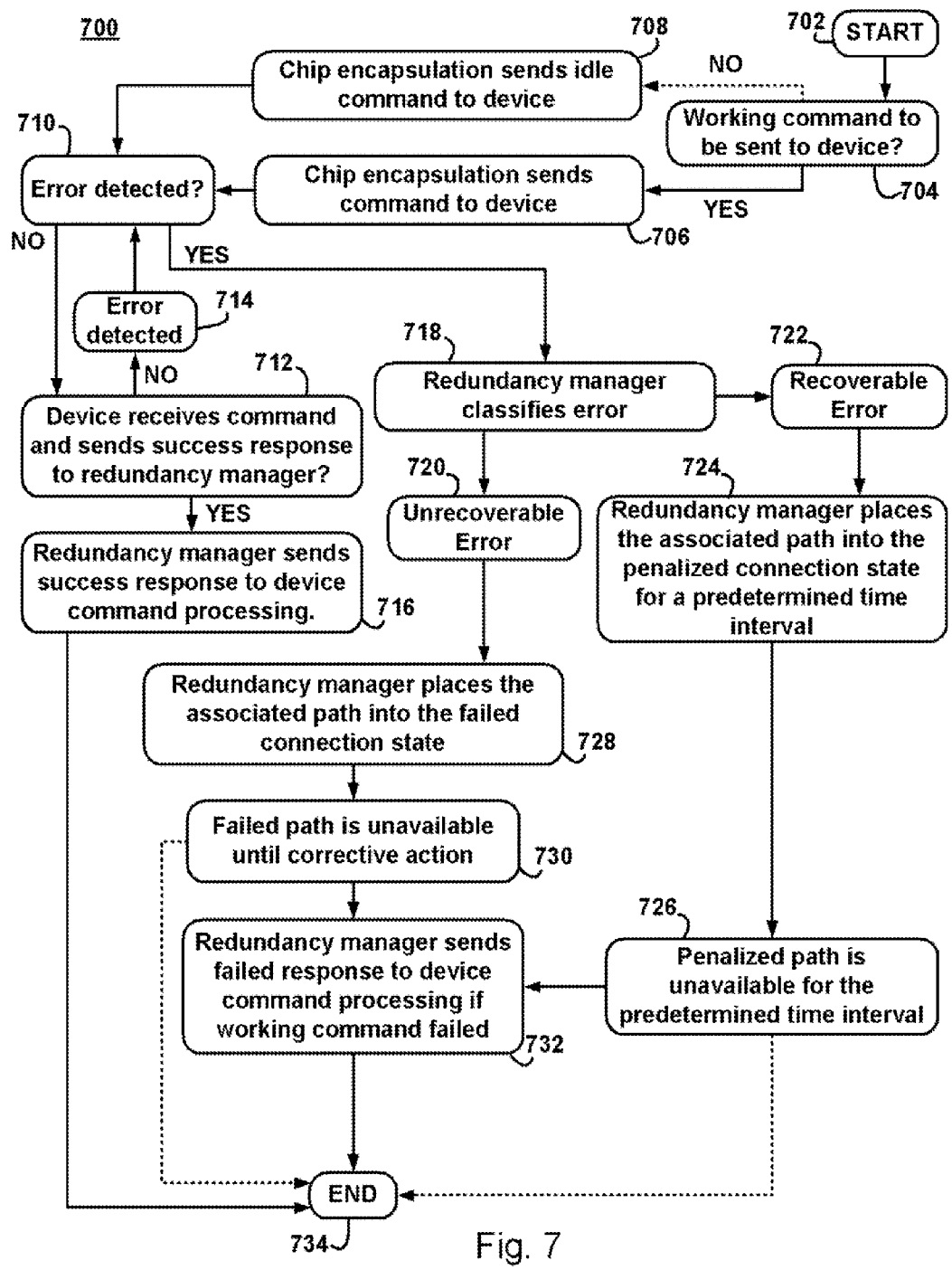
FIG. 7 depicts an exemplary method to determine if a path is available to be included in the selection of a path to route command(s) where the path availability is based at least in part on the penalty based model, according to an embodiment of the present invention.

FIG. 7 depicts an exemplary method 700 to determine if a path is available to be included in the selection of a path to route command(s) where the path availability is based at least in part on the penalty model 400. In certain embodiments, only a few of the elements depicted in FIG. 7 need to be utilized for it to be considered that the path availability is determined at least in part based on the penalty model 400. Method 700 begins at block 702. It is determined if a working command is to be sent to a device (block 704). Chip encapsulation sends the idle command to the device (block 708). Chip encapsulation sends the working command to the device (block 706). In some embodiments idle commands, heartbeat commands, or otherwise non working commands are not utilized, and therefore block 708 may be optional.

The redundancy manager determines if an error has occurred (block 710). If an error has been detected, the redundancy manager 350 classifies the error (block 718). The evaluation and categorization of the error may be based on the error type, error severity, and/or error frequency, and may be accomplished by error classifier 430. If an error has not been detected, it is determined if the device received the command (working or non working) and has sent a success response to the redundancy manager 350. If the device has not received the command and has sent a success response to the redundancy manager 350, an error is detected (block 714). If the device has received the command and has sent a success response to the redundancy manager 350, the redundancy manager 350 sends a success response to device command processing 344 (block 716). If no error is detected, the device received the command and sent a successful response to the redundancy manager, and the redundancy manager sent a success response to device command processing, method 700 ends at block 734.

If the redundancy manager 350 classifies the error as a recoverable error (block 722), the redundancy manager 350 places the associated path into the penalized connection state 403 for a predetermined time interval (block 724). A recoverable error, in certain embodiments, may be considered a medium or low severity error. The penalized path is unavailable for a predetermined timer interval (block 726). If the working command failed to successfully execute, the redundancy manager sends a failed response to device command processing 344 (block 732). If a nonworking command was the command that identified the recoverable error associated with the path, method 700 ends at block 734 (the redundancy manager need not send a failed response to device command processing, or in other words block 732 is not necessary if a non working command identified the recoverable error).

If the redundancy manager 350 classifies the error as an unrecoverable error (block 720), the redundancy manager 350 places the associated path into the failed connection state 404 (block 728). The failed port is unavailable until corrective action is taken (block 730). If the working command failed to successfully execute, the redundancy manager sends a failed response to device command processing 344 (block 732). If a nonworking command was the command that identified the unrecoverable error associated with the path, method 700 ends at block 734 (the redundancy manager need not send a failed response to device command processing, or in other words block 732 is not necessary if a non working command identified the recoverable error).

Figure 8:
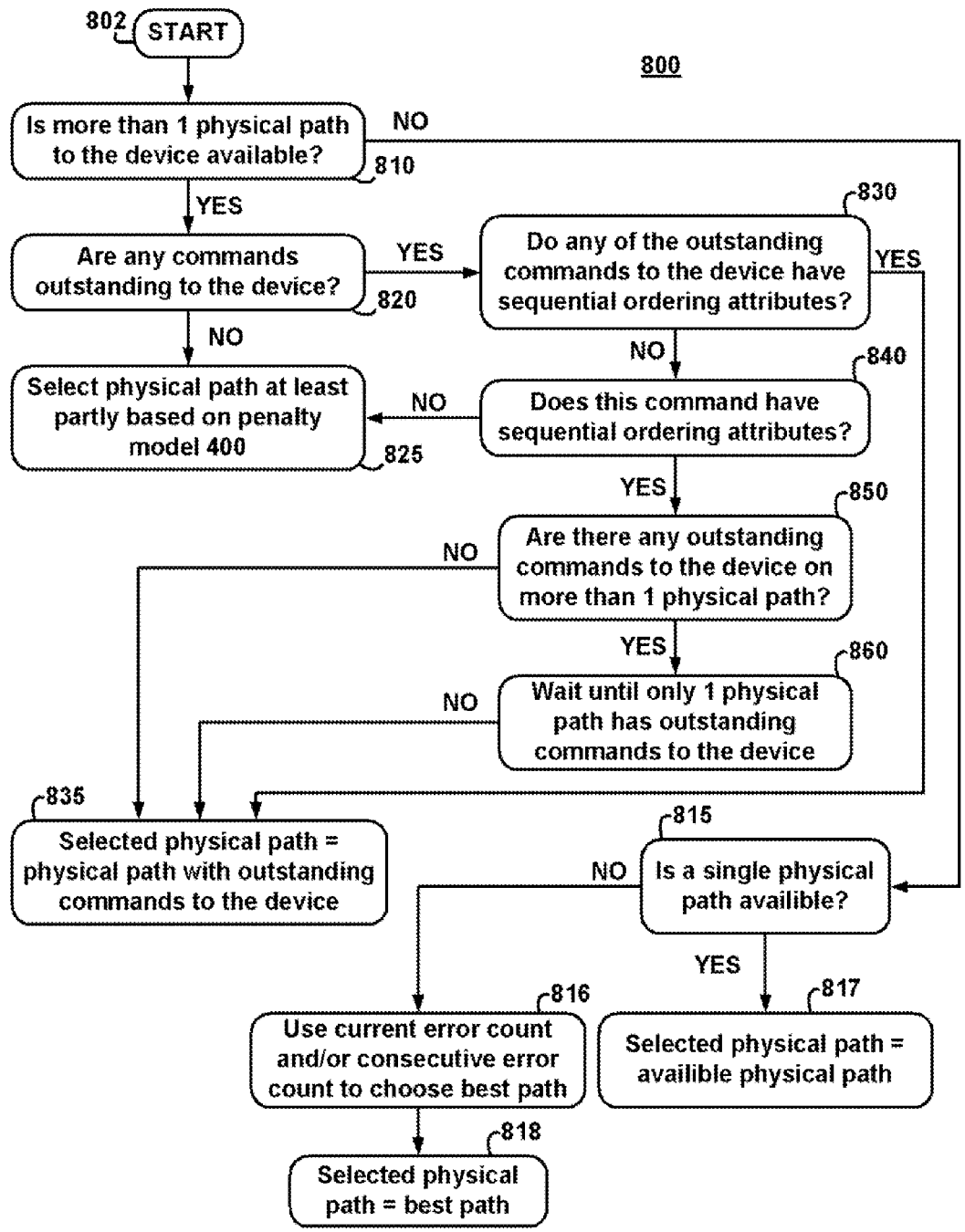
FIG. 8 depicts an exemplary method to select a physical path to a peripheral device for execution of a command, in accordance with an embodiment of the present invention.

FIG. 8 depicts an exemplary method 800 to select a physical path to a peripheral device for execution of a command, in accordance with an embodiment of the present invention. In certain embodiments, method 800 may be utilized by command dispatch path arbitration 410. In other embodiments command dispatch path arbitration 410 may utilize other arbitration schemes in addition to or in lieu of some of the method elements described in FIG. 8.

Method 800 starts at block 802. In certain embodiments the command originates from the host operating system, however in more complex and sophisticated computer systems a command may originate from another peripheral device, a computer system other than the host computer system, and/or from advanced adapter processing within the adapter itself. After a new command to execute arrives in the redundancy manager, the redundancy manager 350 determines if there is more than one available physical path to the device corresponding to the incoming command (block 810). It is determined if there are any available physical paths to the device corresponding to the incoming command (block 815). If there is only a single available physical path to the device the redundancy manager selects that available physical path upon which to transfer the command (block 817). If there is no available physical path to the device (i.e. all of the paths are in the penalized connections state 403, etc.) the redundancy manager chooses a best path (block 816). In certain embodiments the redundancy manager may choose the best path by analyzing the current error count 504, the consecutive error count 506, and/or other path characteristics for all the unavailable paths. The redundancy manager selects the best path upon which to transfer the command (block 818).

If there are redundant physical paths to the device that are also functional, the redundancy manager then determines if there are any outstanding commands to the device (block 820). If there are no outstanding commands, the redundancy manager selects the physical path according to at least in part, the penalty model 400, to balance the number and priority of commands given redundant paths and multiple commands (block 825). In certain embodiments however, if there are outstanding commands, redundancy manager may reroute the command to an available path. If there are outstanding commands to the device the redundancy manager checks if any of the outstanding commands have any special ordering attributes such that the outstanding commands must be executed sequentially or in some other order (block 830). For instance, a WRITE command of updated data to a particular memory location must execute before a READ command to the same memory location to ensure that the correct data is read. If commands that have arrived before the new command must be executed sequentially or in accordance with some other priority or criteria the redundancy manager selects the physical path with the outstanding commands, as in block 835. On the other hand, if none of the outstanding commands have special ordering requirements, the redundancy manager looks at the command to determine if the command has special execution parameters, such as sequential ordering requirements or some other priority (block 840). If not, then as in block 825 the redundancy manager selects the physical path using at least in part the penalty model 400 to balance the number and priority of commands given redundant paths and multiple commands.

If the new command does have special execution parameters, the redundancy manager establishes if there are any outstanding commands to the device on any physical path (block 850). The redundancy manager preserves but does not interfere with the ordering semantics of a particular protocol associated with the physical path. Given the decision that ordering semantics or some other priority scheme must be preserved, the redundancy manager logically degrades the redundant physical paths to one path and the protocol of that physical path then enforces the ordering semantics or priority scheme. If there are outstanding commands on more than one physical path, then the outstanding commands must execute first and the redundancy manager waits until only one physical path has outstanding commands (block 860). The redundancy manager selects the physical path with outstanding commands to the device (block 835). If, however, there is only one physical path that has outstanding commands to the device, then the redundancy manager selects that path having the outstanding commands (block 835).

It is to be understood that the present invention, in accordance with at least one present embodiment, includes elements that may be implemented on at least one electronic enclosure, such as general-purpose server running suitable software programs.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

What is claimed is:

1. A method of managing command routing to peripheral devices comprising:
   determining a number of a plurality of independent physical paths to at least one peripheral device connected to a computer system;
   resolving all of the plurality of independent physical paths to the at least one peripheral device into one logical path;
   presenting the one logical path to any component of the computer system that issues a command destined for the at least one peripheral device;
   receiving the command destined for the at least one peripheral device from the component that issues a command destined for the at least one peripheral device;
   determining the number physical paths in a failed state, wherein the physical paths in a failed state are unable to connect to the at least one peripheral device;
   determining if any of the plurality of independent physical paths are in a temporary penalized state, wherein an independent physical path is placed in a temporary penalized state for a pre-determined penalty time period responsive to detecting a dispatched command error occurring in the independent physical path, the dispatched command error being of a type not causing the independent physical path to be placed in the failed state, and wherein the independent physical path is automatically and unconditionally returned to an active connection state upon expiration of the pre-determined penalty time period; and
   selecting a physical path not in the temporary penalized state and not in the failed state on which to route the received command to the at least one peripheral device.

2. The method of claim 1, further comprising:
   determining the number of outstanding commands to the at least one peripheral device; and
   determining if any outstanding command or the received command has any required execution attributes.

3. The method of claim 2, further comprising:
   honoring any required execution attributes of the received command or of any outstanding commands destined for the at least one peripheral device.

4. The method of claim 3, wherein honoring any required execution attributes of the received command and/or of any outstanding commands intended for the at least one peripheral device further comprises:
   if there are outstanding commands, determining if any outstanding command have any required execution attributes;
   determining if the received command has any required execution attribute;
   determining if there are any outstanding commands to the at least one peripheral device on more than one independent physical path;
   if so, waiting until only one independent physical path has any outstanding commands for the peripheral device and selecting the physical path with the outstanding commands for the received command.

5. The method of claim 1 further comprising:
   reallocating a received command load to the peripheral device on the independent paths.

6. The method of claim 1, further comprising:
   preserving protocol requirements of the selected physical path.

7. The method of claim 1, further comprising:
   removing at least one independent physical path from the temporary penalized state if there is no available independent physical path to the at least one peripheral device.

8. The method of claim 1, wherein selecting a physical path not in the temporary penalized state and not in the failed state on which to route the received command to the at least one peripheral device uses at least one load balancing factor if there is more than one physical path not in the temporary penalized state and not in the failed state.

9. A computer program product for managing command routing to peripheral devices, the computer program product comprising:
   a non-transitory computer usable storage medium having computer usable program code embodied therewith, the computer usable program code comprising:
   computer usable program code configured to:
   determine a number of a plurality of independent physical paths to at least one peripheral device connected to a computer system;
   resolve all of the plurality of independent physical paths to the at least one peripheral device into one logical path;
   present the one logical path to any component of the computer system that issues a command destined for the at least one peripheral device;
   receive the command destined for the at least one peripheral device from the component that issues a command destined for the at least one peripheral device;
   determine the number physical paths in a failed state, wherein the physical paths in a failed state are unable to connect to the at least one peripheral device;
   determine if any of the plurality of independent physical paths are in a temporary penalized state, wherein an independent physical path is placed in a temporary penalized state for a pre-determined penalty time period responsive to detecting a dispatched command error occurring in the independent physical path, the dispatched command error being of a type not causing the independent physical path to be placed in the failed state, and wherein the independent physical path is automatically and unconditionally returned to an active connection state upon expiration of the pre-determined penalty time period; and
   select a physical path not in the temporary penalized state and not in the failed state on which to route the received command to the at least one peripheral device.

10. The computer program product of claim 9, wherein the computer usable program code is further configured to:
    determine the number of outstanding commands to the at least one peripheral device; and
    determine if any outstanding command or the received command has any required execution attributes.

11. The computer program product of claim 10, wherein the computer usable program code is further configured to:
    honor any required execution attributes of the received command or of any outstanding commands destined for the at least one peripheral device.

12. The computer program product of claim 11, wherein honoring any required execution attributes of the received command and/or of any outstanding commands intended for the at least one peripheral device further comprises:

if there are outstanding commands, determining if any outstanding command have any required execution attributes;

determining if the received command has any required execution attribute;

determining if there are any outstanding commands to the at least one peripheral device on more than one independent physical path;

if so, waiting until only one independent physical path has any outstanding commands for the peripheral device and selecting the physical path with the outstanding commands for the received command.

13. The computer program product of claim 9, wherein the computer usable program code is further configured to:

reallocate a received command load to the peripheral device on the independent paths.

14. The computer program product of claim 9, wherein the computer usable program code is further configured to:

preserve protocol requirements of the selected physical path.

15. The computer program product of claim 9, wherein the computer usable program code is further configured to:

remove at least one independent physical path from the temporary penalized state if there is no available independent physical path to the at least one peripheral device.

16. The computer program product of claim 9, wherein selecting a physical path not in the temporary penalized state and not in the failed state on which to route the received command to the at least one peripheral device uses at least one load balancing factor if there is more than one physical path not in the temporary penalized state and not in the failed state.

* * * * *